(12) United States Patent
Graham et al.

(10) Patent No.: US 7,890,858 B1
(45) Date of Patent: Feb. 15, 2011

(54) TRANSFERRING, PROCESSING AND DISPLAYING MULTIPLE IMAGES USING SINGLE TRANSFER REQUEST

(75) Inventors: Adrian Graham, Palo Alto, CA (US); James C. Norris, Mountain View, CA (US)

(73) Assignee: Google Inc., Mountain View, CA (US)

(*) Notice: Subject to any disclaimer, the term of this patent is extended or adjusted under 35 U.S.C. 154(b) by 1374 days.

(21) Appl. No.: 11/247,110

(22) Filed: Oct. 11, 2005

(51) Int. Cl.
*G06F 17/21* (2006.01)
(52) U.S. Cl. .................. 715/253; 715/200; 715/234
(58) Field of Classification Search ............ 715/200, 715/234, 253
See application file for complete search history.

(56) References Cited

U.S. PATENT DOCUMENTS

| | | | |
|---|---|---|---|
| 7,003,736 B2 * | 2/2006 | Kanevsky et al. | 715/837 |
| 7,536,705 B1 * | 5/2009 | Boucher et al. | 725/112 |
| 2003/0164852 A1 * | 9/2003 | Simpson et al. | 345/748 |
| 2005/0080871 A1 * | 4/2005 | Dinh et al. | 709/217 |
| 2006/0206795 A1 * | 9/2006 | Hess et al. | 715/500 |
| 2008/0018658 A1 * | 1/2008 | Bruno et al. | 345/581 |

OTHER PUBLICATIONS

"11 Visual Effects", Feb. 25, 2004, W3C, pp. 1-7, <http://www.w3.org/TR/2004/CR-CSS21-20040224/visufx.html>.*

* cited by examiner

*Primary Examiner*—Joshua D Campbell
(74) *Attorney, Agent, or Firm*—Fish & Richardson P.C.

(57) ABSTRACT

Systems and methods for transferring, processing and displaying multiple images using a single transfer request such as a Transfer Control Protocol/Internet Protocol (TCP/IP) transfer request are disclosed. The method may generally include requesting a document, e.g., an HTML document, that references a composite image containing multiple image portions, splitting the composite image into the multiple image portions, determining a layout of the image portions in a client browser, e.g., a web page browser, and laying out the image portions in the client browser according to the determined layout. The splitting of the composite image into the multiple image portions may utilize Cascading Style Sheets (CSS), e.g., using a CSS clip function for each image portion, and may use absolute positioning of the image portions within the composite image. The determining the layout and the laying out of the multiple image portions may be implemented utilizing JavaScript.

22 Claims, 5 Drawing Sheets

```
<div id="image0" style="overflow:hidden;position:absolute;clip:rect(0px 128px 96px 0px);margin-left:0px;
        width:128px;height:96px;left:-256px"><img src="CompositeImage.jpg"></div>
<div id="image1" style="overflow:hidden;position:absolute;clip:rect(0px 256px 96px 128px);margin-left:-128px;
        width:256px;height:96px;left:-256px"><img src="CompositeImage.jpg"></div>
<div id="image2" style="overflow:hidden;position:absolute;clip:rect(0px 384px 96px 256px);margin-left:-256px;
        width:384px;height:96px;left:-256px"><img src="CompositeImage.jpg"></div>
<div id="image3" style="overflow:hidden;position:absolute;clip:rect(0px 512px 96px 384px);margin-left:-384px;
        width:512px;height:96px;left:-256px"><img src="CompositeImage.jpg"></div>
<div id="image4" style="overflow:hidden;position:absolute;clip:rect(0px 640px 96px 512px);margin-left:-512px;
        width:640px;height:96px;left:-256px"><img src="CompositeImage.jpg"></div>
<div id="image5" style="overflow:hidden;position:absolute;clip:rect(0px 768px 96px 640px);margin-left:-640px;
        width:768px;height:96px;left:-256px"><img src="CompositeImage.jpg"></div>
<div id="image6" style="overflow:hidden;position:absolute;clip:rect(0px 896px 96px 768px);margin-left:-768px;
        width:896px;height:96px;left:-256px"><img src="CompositeImage.jpg"></div>
<div id="image7" style="overflow:hidden;position:absolute;clip:rect(0px 1024px 96px 896px);margin-left:-896px;
        width:1024px;height:96px;left:-256px"><img src="CompositeImage.jpg"></div>
<div id="image8" style="overflow:hidden;position:absolute;clip:rect(0px 1152px 96px 1024px);margin-left:-1024px;
        width:1152px;height:96px;left:-256px"><img src="CompositeImage.jpg"></div>
<div id="image9" style="overflow:hidden;position:absolute;clip:rect(0px 1280px 96px 1152px);margin-left:-1152px;
        width:1280px;height:96px;left:-256px"><img src="CompositeImage.jpg"></div>
<div id="image10" style="overflow:hidden;position:absolute;clip:rect(0px 1408px 96px 1280px);margin-left:-1280px;
        width:1408px;height:96px;left:-256px"><img src="CompositeImage.jpg"></div>
<div id="image11" style="overflow:hidden;position:absolute;clip:rect(0px 1536px 96px 1408px);margin-left:-1408px;
        width:1536px;height:96px;left:-256px"><img src="CompositeImage.jpg"></div>
<div id="image12" style="overflow:hidden;position:absolute;clip:rect(0px 1664px 96px 1536px);margin-left:-1536px;
        width:1664px;height:96px;left:-256px"><img src="CompositeImage.jpg"></div>
<div id="image13" style="overflow:hidden;position:absolute;clip:rect(0px 1792px 96px 1664px);margin-left:-1664px;
        width:1792px;height:96px;left:-256px"><img src="CompositeImage.jpg"></div>
<div id="image14" style="overflow:hidden;position:absolute;clip:rect(0px 1920px 96px 1792px);margin-left:-1792px;
        width:1920px;height:96px;left:-256px"><img src="CompositeImage.jpg"></div>
<div id="image15" style="overflow:hidden;position:absolute;clip:rect(0px 2016px 128px 1920px);margin-left:-1920px;
        width:2016px;height:128px;left:-256px"><img src="CompositeImage.jpg"></div>
<div id="image16" style="overflow:hidden;position:absolute;clip:rect(0px 2176px 96px 2048px);margin-left:-2048px;
        width:2176px;height:96px;left:-256px"><img src="CompositeImage.jpg"></div>
<div id="image17" style="overflow:hidden;position:absolute;clip:rect(0px 2304px 96px 2176px);margin-left:-2176px;
        width:2304px;height:96px;left:-256px"><img src="CompositeImage.jpg"></div>
<div id="image18" style="overflow:hidden;position:absolute;clip:rect(0px 2400px 128px 2304px);margin-left:-2304px;
        width:2400px;height:128px;left:-256px"><img src="CompositeImage.jpg"></div>
<div id="image19" style="overflow:hidden;position:absolute;clip:rect(0px 2560px 96px 2432px);margin-left:-2432px;
        width:2560px;height:96px;left:-256px"><img src="CompositeImage.jpg"></div>
<div id="image20" style="overflow:hidden;position:absolute;clip:rect(0px 2688px 96px 2560px);margin-left:-2560px;
        width:2688px;height:96px;left:-256px"><img src="CompositeImage.jpg"></div>
```

Portion of Source Code to Separate (Clip) Out Individual Smaller Images
From CompositeImage.jpg Using Cascading Style Sheets

FIG. 2

```
<html>
<head>
<script> function moveTo(name, x, y)
// moveTo moves the layer so that its top-left corner is at the specified location in the containing layer or document
{
        var obj = document.getElementById(name);
        if (obj)
        {
                var style = obj.style;
                var units = (typeof obj.left == "string") ? "px" : 0;
                style.left = x + units;
                style.top = y + units;
        }
        else
        {
                alert("failed to find [" + name + "]");
        }
} function layoutImages()
{
        var initialX = 25;
        var initialY = 50;
        var numImages = 21;
        var imageWidth = 128;
        var imageHeight = 128;
        var parentWidth = document.body.clientWidth;
        var imagePadding = 5;
        var totalImageWidth = imageWidth + imagePadding; // includes border
        var totalImageHeight = imageWidth + imagePadding; // includes border var widthInImages = Math.floor((parentWidth - initialX) / totalImageWidth); //no. of images in each row
        var heightInImages = Math.floor(numImages / widthInImages);

if (numImages % widthInImages != 0)
                heightInImages++; //number of rows of images if (heightInImages == 0 || widthInImages == 0)
                return;

for (y = 0; y < heightInImages; y++) // for each row of images
        {
                for (x = 0; x < widthInImages; x++) // for each image in the given row
                {
                        var currentIndex = y * widthInImages + x; //image number (0, 1, ..., 20)
                        if (currentIndex >= numImages)
                                break;
                        var currentImage = "image" + currentIndex; //image0, image 1, ... image20
                        moveTo(currentImage, initialX + x * totalImageWidth, initialY + y * totalImageHeight);
                }
        }
}
</script>
</head>
<body onResize="layoutImages();">

// Portion of Source Code to Separate (Clip) Out Individual Smaller Images From CompositeImage.jpg
Using Cascading Style Sheets (Removed for Purposes of Clarity) (SEE FIG. 2)

<script>layoutImages();</script>

</body>
</html>
```

**Remainder of Source Code for Rendering Individual Smaller Images
Separate (Clipped) Using Cascading Style Sheets**

FIG. 3

TRANSFERRING, PROCESSING AND DISPLAYING MULTIPLE IMAGES USING SINGLE TRANSFER REQUEST

BACKGROUND OF THE INVENTION

1. Field of the Invention

The present invention relates generally to requesting and processing multiple images for display over a network. More specifically, systems and methods for transferring, processing and displaying multiple images using a single transfer request such as a Transfer Control Protocol/Internet Protocol (TCP/IP) transfer request are disclosed.

2. Description of Related Art

When a user requests a web page containing multiple images, a separate network request is typically made to fetch each of the multiple images. Because of the overhead associated with each network request made to fetch each image, progressively more time may be spent making such network requests to fetch the images as the number of images contained in a given web page increases.

Thus, it would be desirable to provide systems and methods for processing and displaying multiple images while minimizing network overhead and/or the number of network requests. Ideally, such systems and methods would not require special client-side software to be installed.

SUMMARY OF THE INVENTION

Systems and methods for transferring, processing and displaying multiple images using a single transfer request such as a Transfer Control Protocol/Internet Protocol (TCP/IP) transfer request are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method, on a client side, for receiving and displaying multiple smaller images or image portions may generally include requesting a document, e.g., an HTML document, having a reference to a composite image containing the multiple image portions from a server, splitting the composite image into the multiple image portions, determining a layout of the multiple smaller image portions in a client document browser, e.g., a web page browser, and laying out the multiple smaller image portions in the client document browser according to the determined layout, the splitting, determining, and laying out being according to instructions contained in the document. The requesting, splitting, determining, and laying out are typically performed by the client document browser.

The splitting of the composite image into the multiple smaller image portions may utilize Cascading Style Sheets (CSS), e.g., using a CSS clip function for each smaller image portion, and may use absolute positioning of the smaller image portions within the composite image. The determining the layout and the laying out of the multiple smaller image portions may be implemented utilizing at least one JavaScript function. For example, the laying out of the multiple smaller image portions of the composite image may be according to a size of the client document browser.

On a server side, the method for serving multiple smaller images or image portions generally includes providing a composite image containing the multiple smaller image portions, providing a document containing instructions for a client document browser to split the composite image into the multiple smaller image portions and to lay out the multiple smaller image portions in a client document browser, serving the document in response to a request for the document from the client document browser, and serving the composite image to the client document browser.

The system for transferring, processing and displaying multiple images using a single transfer request may be implemented as a computer program product for use in conjunction with a computer system, the computer program product comprising a computer readable storage medium on which are stored instructions executable on a computer processor. The instructions generally include requesting a composite image from a server, the composite image containing a plurality of smaller image portions, splitting the composite image into the plurality of smaller image portions, determining a layout of the plurality of the smaller image portions in a client document browsing window, and positioning the plurality of the smaller image portions according to the determined layout in the client document browsing window.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

FIGS. 2 and 3 illustrate an example of a Hypertext Markup Language (HTML) source code for displaying individual smaller images contained in a composite image such as that shown in FIG. 1 using a single TCP transfer request for the composite image. FIG. 2 presents an illustrative portion of the HTML source code that uses CSS to mask or separate out each individual smaller image contained in a composite image.

FIG. 3 presents an illustrative portion of the HTML source code that uses Javascript to layout the individual smaller images in the web page as typical image layers.

DESCRIPTION OF SPECIFIC EMBODIMENTS

Figure 1:
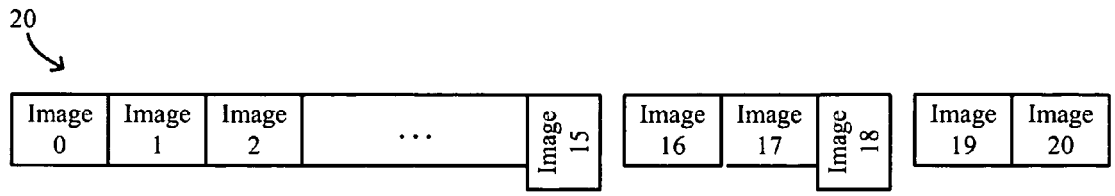
FIG. 1 illustrates an exemplary composite image containing 21 individual smaller images.

Systems and methods for transferring, processing and displaying multiple images using a single transfer request such as a Transfer Control Protocol/Internet Protocol (TCP/IP) transfer request are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The systems and methods described herein may be used in various applications for more efficient rendering of a web page in a web browser. For example, one common use may be to display a page full of image thumbnails such as with a photo hosting service or any other service that handles displaying multiple images to a user. Typically such a page may contain 50 or more images, and, as a result, requires 50 or more server round-trips between the web browser and the server to fetch all the images.

The systems and methods described herein generally works with standard web browsers such as Internet Explorer, Netscape Navigator, and Mozilla Firefox, without requiring special software be installed on the client side. In particular, the transferring of multiple smaller images may be generally achieved by using a single TCP/IP network transfer request transmitted to the server for a composite image that contains the multiple smaller images tiled together. By tiling (or otherwise organizing or storing) multiple smaller images in a single composite image, the network overhead can be reduced or minimized by eliminating the need for a separate server transfer request for each of the multiple smaller images.

Upon receiving the single composite image, the web browser may then use, for example, a combination of JavaScript and Cascading Style Sheets (CSS) to process and display the multiple images in the web page. Specifically, web browser may use CSS to split apart the single composite image containing the individual smaller images tiled together into the individual smaller images. The web browser may then use, for example, JavaScript to position or otherwise render the individual smaller images in the web page as typical image layers. Thus, the web page can render the individual smaller images contained in the single composite image using a single network request for the single composite image, resulting in reducing or minimizing network overhead and rendering or displaying the multiple individual smaller images more quickly and efficiently.

The processing and displaying of multiple smaller images as described herein generally does not require special software to be installed on the client side and generally utilizes JavaScript and CSS. Although JavaScript and CSS are presented herein as illustrative methods for transferring, processing and displaying of multiple smaller images, any other suitable methods may be similarly employed. In addition, it is noted that although the illustrative methods are described herein as using a single TCP/IP request only for purposes of clarity, multiple such requests may be made for multiple composite images in rendering a given hypertext markup language (HTML) document or web page.

FIG. 1 illustrates an exemplary composite image 20 containing 21 individual smaller images, e.g., thumbnails, tiled together. Although the illustrative composite images illustrated and described herein contain individual smaller images tiled together, e.g., vertically or horizontally, various other suitable configurations may be similarly employed, e.g., in a grid fashion, with or without margins, etc. In the current example, all images are oriented in a landscape orientation except images 15 and 18 are in portrait orientation. As such, each image is 128 pixels in width and 96 pixels in height except images 15 and 18 are 96 pixels in width and 128 pixels in height. In addition, each image occupies a space that is 128 pixels in width within the composite image 20.

FIGS. 2 and 3 illustrate an example of an HTML source code for displaying the 21 individual smaller images contained in the composite image 20 shown in FIG. 1 using a single TCP transfer request for the composite image 20. The 21 smaller images are displayed according to the size of the browser, for example. In this example, the composite image file or source is CompositeImage.jpg.

Specifically, FIG. 2 illustrates an illustrative portion of the HTML source code that uses CSS to mask, separate or clip out each of the 21 individual smaller images contained in the composite image. Currently, the standard for style sheets is Cascading Style Sheets, level 1, also known as CSS1. However, the systems and methods presented herein can be adapted to future standards for style sheets. As is known, Cascading Style Sheets are a powerful and flexible way of specifying formatting information for web pages.

In the example shown in FIG. 2, each individual smaller image is clipped or separated out from the remainder of the composite image as a layer or element. Each layer corresponding to a smaller image is given a name which in turn can be used by JavaScript code to layout the images, as will be described in more detail, infra, with reference to FIG. 3. In the current example, the 21 smaller images are named image0, image1, . . . , image20 using the id property.

Each layer corresponding to a smaller image is clipped from the composite image using the style applied to the layer. Several properties may be defined for the style applied to the layer. For example, the overflow property specifies what happens when a layer's contents exceed the layer's height and/or width, e.g., whether the content of a block-level layer is clipped when it overflows the layer's box, which acts as a containing block for the content. In the current example, the value of the overflow property is set to "hidden" to indicate that the content is clipped and that no scrolling mechanism should be provided to view the content outside the clipping region. In other words, when the value of the overflow property is set to "hidden," users will not have access to the clipped content.

The value of the position property is set to "absolute" to specify that the clipping region or box is laid out according to an absolute positioning scheme (e.g., absolute coordinates) in which a box is removed from the normal flow entirely, e.g., the box has no impact on later siblings, and assigned a position with respect to the containing (clipping) block.

The size and shape of each clipping region or box, e.g., the visible portion, for each smaller image can be defined using the clip property. In particular, for each smaller image, a CSS-style container may be used to mask around the composite image to specify the boundaries of the visible area of the corresponding layer. In the current example, each smaller image is extracted from the composite image using "clip:rect (top right bottom left)" where "rect" specifies that the clipping region or box is rectangular in shape and top, right, bottom, and left are offset values from the respective sides of the composite image and may be defined using an absolute positioning scheme, e.g., pixel numbers. As an example, the pixel values of the top, right, bottom, and left offsets for the clipping region for image0 are set to 0px, 128px, 96px, and 0px. These pixels values define the clipping region around image0 of the composite image 20 (shown in FIG. 1). It is noted that although currently CSS only allows rectangular clipping regions, future extensions or versions may permit non-rectangular clipping and the present systems and methods may be adapted to utilize such non-rectangular clipping.

Note that in the current example, for each smaller image, the top offset is set to 0px, the right offset is set in increments of 128px (from 128px for image0 to 2688px for image20), the bottom offset is set to 96px for each of the smaller images except 128px for images 15 and 18, and the left offset is set in increments of 128px, each being 128px less than the right offset (from 0px for image0 to 2560px for image20).

The margin-left property sets the left margin for the particular smaller image. A negative value allows the image or graphics to hang into the left margin and/or overlap previous paragraphs or graphics. In the current example, the margin-left property is set in increments of −128px (from 0px for image0 to −2560px for image20). The width property sets a fixed width for the layer or element. In the current example, the width property is set in increments of 128px (from 128px for image0 to 2688px for image20), e.g., the absolute value of the margin-left property plus 128px. The height property sets a fixed height for the layer or element. In the current example, the height property is set to 96px for each of the smaller images except the height property is set to 128px for images 15 and 18. The left property specifies the horizontal absolute position of the layer. In the current example, the left property is set to −256px for all images to move each layer off screen while the image is loading, e.g., to help prevent flicker. Note that the left property does not change where the image ultimately appears as the final layout is specified by JavaScript which overwrites the left property to make the images flow properly. Lastly, each layer defines the image source to be CompositeImage.jpg.

FIG. 3 illustrates an illustrative portion of the HTML source code that uses Javascript to layout the individual smaller images in the web page as typical image layers according to the size of the browser window. As shown, the source code generally includes two Javascript functions, layoutImages and moveTo.

For each smaller image or thumbnail, function layoutImages determines the position of and positions the top-left corner of the layer, e.g., the smaller image, in the containing layer or document. In particular, function layoutImages calls the function moveTo to position the particular smaller image in the browser window at the specified location. In the example shown, function layoutImages is executed upon opening or launching the web page and upon resizing, e.g., of the browser window.

Figure 4:
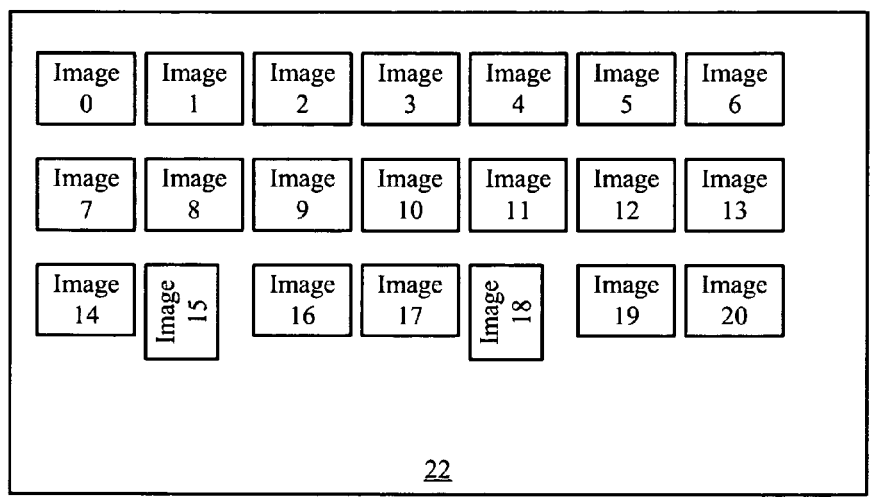
FIGS. 4 and 5 are exemplary browser window of different widths for displaying the individual smaller images of the composite image of FIG. 1.
Figure 5:
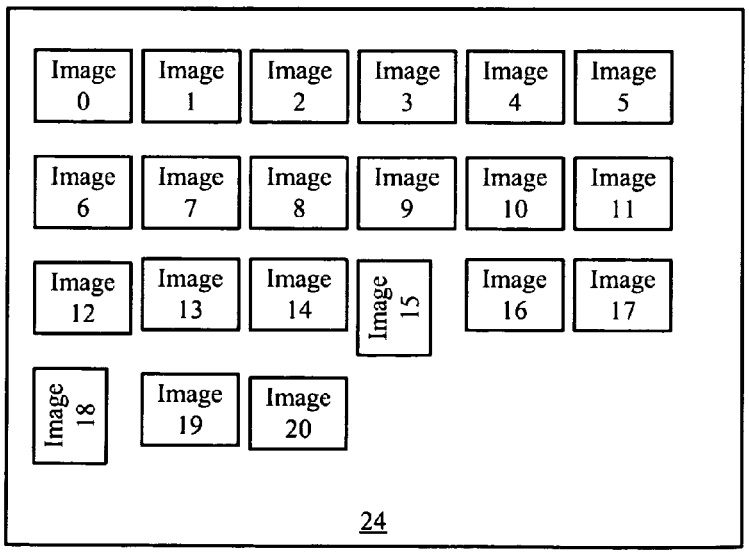

FIGS. 4 and 5 are exemplary browser window of different widths for displaying the individual smaller images of the composite image of FIG. 1. The width of the browser window 22 shown in FIG. 4 accommodates or fits 7 images across such that the 21 smaller images contained by the composite image occupy 3 rows in the browser window 22. The width of the browser window 24 shown in FIG. 5 accommodates or fits 6 images across such that the 21 smaller images contained by the composite image occupy 4 rows (6 images in each of the first 3 rows and 3 images in the fourth row) in the browser window 24.

Figure 6:
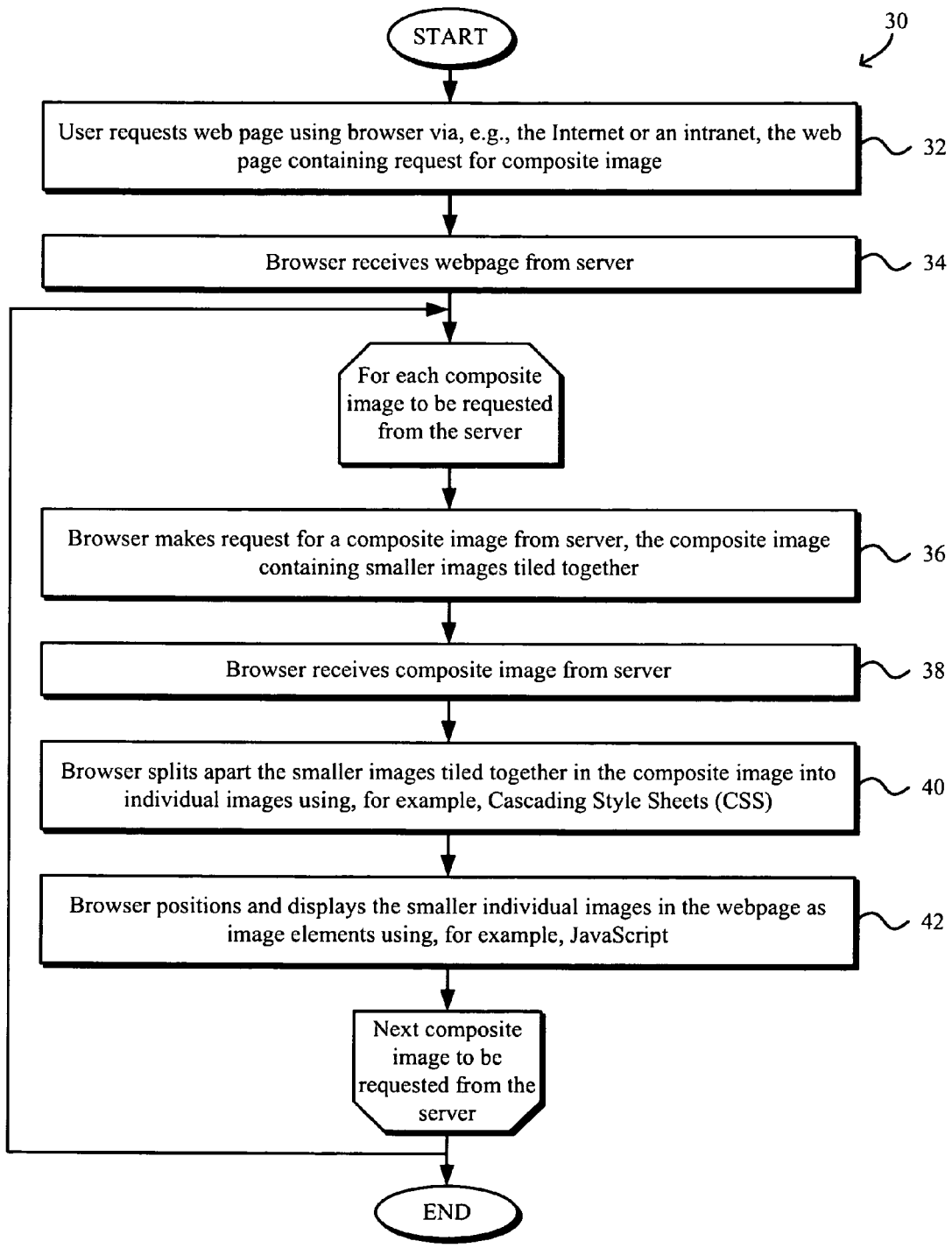
FIG. 6 is a flowchart of an exemplary client-side process for transferring, processing and displaying multiple images using a single transfer request.

The processes for the client-side and the server-side are described in detail below with reference to FIGS. 6 and 7, respectively. In particular, FIG. 6 is a flowchart of an exemplary client-side process 30 for transferring, processing and displaying multiple images using a single transfer request such as a Transfer Control Protocol/Internet Protocol (TCP/IP) transfer request. At block 32, a user may request a web page using a browser via, e.g., the Internet or an intranet, where the web page contains at least one request for a composite image. It is to be understood that the composite image typically refers an image containing multiple smaller images but may also refer to one or more larger images to be split into smaller images. At block 34, the browser receives the web page, e.g., the HTML source code, from the server.

The source code may contain a request for a single composite image or may contain multiple requests for multiple composite images. For each composite image to be requested from the server, blocks 36, 38, 40, and 42 may be performed. Specifically, at block 36, in executing the source code received at block 34, the browser makes a request for a composite image from the server. As noted, the composite image typically contains multiple smaller images tiled together. At block 38, the browser receives the composite image from the server. At block 40, the browser splits apart the smaller images tiled together in the composite image into individual smaller images using, for example, Cascading Style Sheets (CSS). At block 42, the browser positions and displays the smaller individual images in the webpage as image layers using, for example, JavaScript. The client-side process 30 may return to block 36 for the next composite image to be requested from the server, if any.

Figure 7:
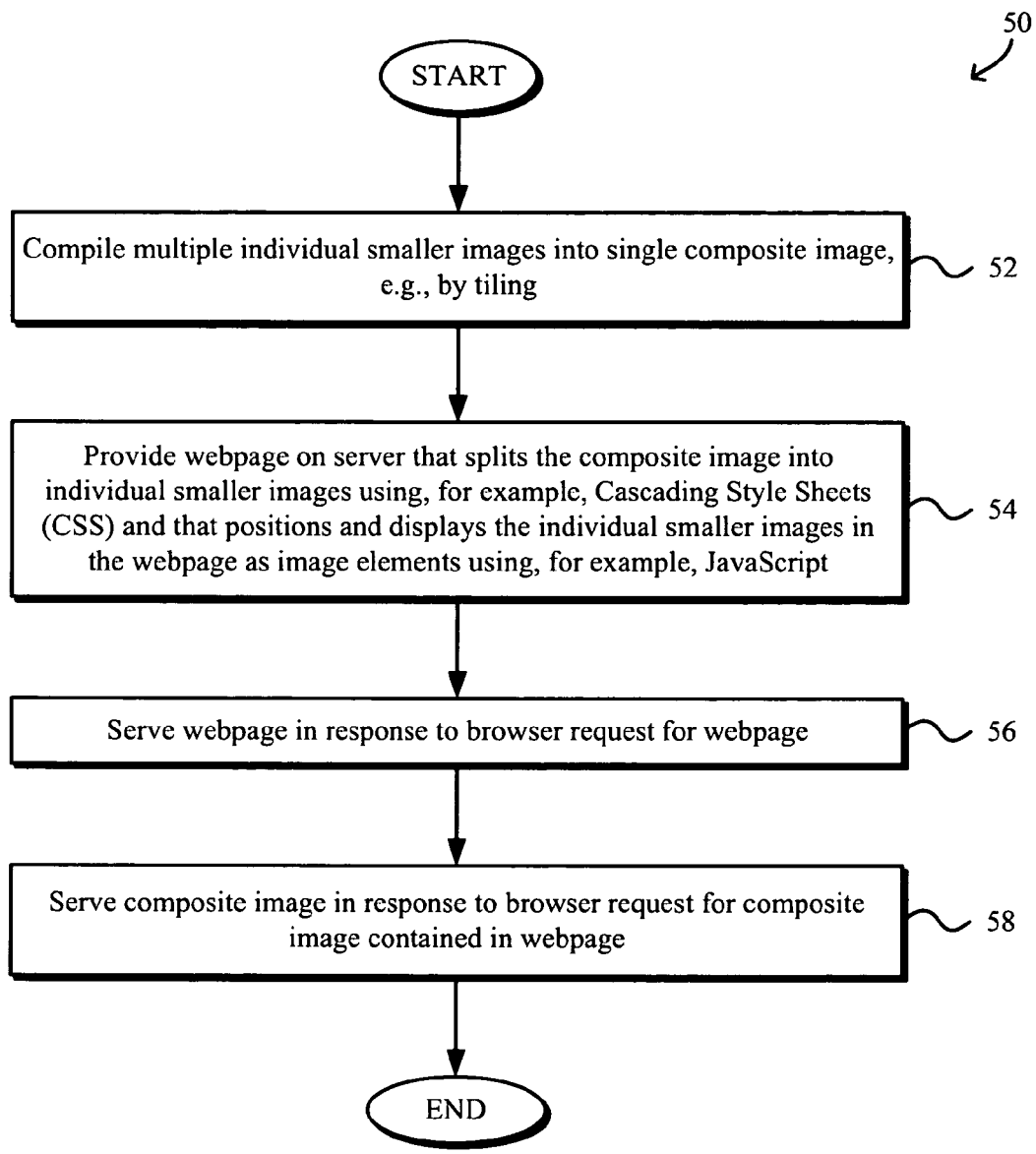
FIG. 7 is a flowchart of an exemplary server-side process to enable a client-side browser to transfer, process and display multiple images using a single transfer request.

FIG. 7 is a flowchart of an exemplary server-side process 50 to enable a client-side browser to transfer, process and display multiple images using a single transfer request such as a TCP/IP transfer request. At block 52, multiple individual smaller images are compiled into single composite image, e.g., by tiling. At block 54, the server provides the web page, e.g., the HTML source code, that splits the composite image into individual smaller images using, for example, Cascading Style Sheets (CSS) and that positions and displays the individual smaller images in the client web page as image layers using, for example, JavaScript.

At block 56, the server serves the web page, e.g., the source code for the web page, in response to a client-side browser request for the web page. At block 58, the server serves the composite image in response to a browser request for the composite image contained in web page. As noted above, the source code may contain multiple composite images such that the server may perform block 58 for each composite image.

While the exemplary embodiments of the present invention are described and illustrated herein, it will be appreciated that they are merely illustrative and that modifications can be made to these embodiments without departing from the spirit and scope of the invention. For example, the systems and methods described herein are preferably implemented without requiring special software to be installed on the client side, as generally described in the illustrative examples presented. As one alternative, the systems and methods may be implemented as a web browser plug-in or an Active X control, for example. However, such alternative methodologies require the user to install special client software. As yet another alternative, similar functionalities may be achieved using Flash but such an implementation would be limited to flash documents rather than HTML web pages. Yet another alternative for decreasing the load time of multiple images in a browser window is to compose the composite image in a manner that the smaller images are to be displayed, e.g., by displaying all requested images as a single large image in which the smaller images are tiled together. However, such a scheme would not allow the browser to have control over layer as the composite image would be one large image rather than multiple individual smaller images. Thus, the scope of the invention is intended to be defined only in terms of the following claims as may be amended, with each claim being expressly incorporated into this Description of Specific Embodiments as an embodiment of the invention.

What is claimed is:

1. A method for serving multiple image portions, comprising:

providing a single composite image containing the multiple image portions;

providing a document containing instructions for a client document browser to split the single composite image into the multiple image portions, to separate each image portion as a layer, to provide multiple layer names, each layer name corresponding to a layer, and to lay out the multiple image portions in a client document browser based on the layer names;

serving the document in response to a request for the document from the client document browser; and serving the single composite image to the client document browser.

2. The method of claim 1, wherein the instructions contained in the document for the client document browser to split the single composite image into the multiple image portions utilize Cascading Style Sheets (CSS).

3. The method of claim 2, wherein the instructions contained in the document for the client document browser to split the single composite image into the multiple image portions utilizes a CSS clip function for each image portion.

4. The method of claim 1, wherein the document splits the single composite image into the multiple image portions utilizing absolute positioning of the image portions within the single composite image.

5. The method of claim 1, wherein the instructions contained in the document for the client document browser to lay out the multiple image portions utilize JavaScript.

6. The method of claim 1, wherein the instructions contained in the document include instructions to lay out the multiple image portions according to a size of the client document browser.

7. The method of claim 1, wherein the document is a Hypertext Markup Language (HTML) document.

8. A computer program product for use in conjunction with a computer system, the computer program product comprising a computer readable storage medium on which are stored instructions executable on a computer processor, the instructions including:

requesting a single composite image from a server, the single composite image containing a plurality of image portions;

splitting the single composite image into the plurality of image portions based on instructions for a client document browser to split the single composite image into the plurality of image portions, to separate each image portion as a layer, and to provide multiple layer names, each layer name corresponding to a layer;

determining a layout of the plurality of the image portions in a client document browsing window based on the layer names; and positioning the plurality of the image portions according to the determined layout in the client document browsing window.

9. The computer program product of claim 8, wherein the splitting of the single composite image into the plurality of the image portions utilizes Cascading Style Sheets (CSS).

10. The computer program product of claim 9, wherein the splitting of the single composite image into the plurality of the image portions utilizes a CSS clip function for each of the image portions.

11. The computer program product of claim 8, wherein the splitting of the single composite image into the plurality of the image portions utilizes absolute positioning of the image portions within the single composite image.

12. The computer program product of claim 8, wherein the determining the layout and the positioning of the plurality of the image portions are implemented utilizing at least one JavaScript function.

13. The computer program product of claim 8, wherein the laying out of the plurality of the image portions of the single composite image is according to a size of the client document browser.

14. The computer program product of claim 8, wherein the client document browser is a web page browser.

15. A method for receiving and displaying multiple image portions, comprising:

requesting a document from a server, the document including a reference to a single composite image containing the multiple image portions;

splitting the single composite image into the multiple image portions based on instructions for a client document browser to split the single composite image into the multiple image portions, to separate each image portion as a layer, and to provide multiple layer names, each layer name corresponding to a layer;

determining a layout of the multiple image portions in the client document browser based on the layer names; and laying out the multiple image portions in the client document browser according to the determined layout, the splitting, determining, and laying out being according to instructions contained in the document.

16. The method of claim 15, wherein the requesting, splitting, determining, and laying out are performed by the client document browser.

17. The method of claim 15, wherein the splitting of the single composite image into the multiple image portions utilizes Cascading Style Sheets (CSS).

18. The method of claim 17, wherein the splitting of the single composite image into the multiple image portions utilizes a CSS clip function for each of the image portions.

19. The method of claim 15, wherein the splitting of the single composite image into the multiple image portions utilizes absolute positioning of the image portions within the single composite image.

20. The method of claim 15, wherein the determining the layout and the laying out of the multiple image portions are implemented utilizing at least one JavaScript function.

21. The method of claim 15, wherein the laying out of the multiple image portions of the single composite image is according to a size of the client document browser.

22. The method of claim 15, wherein the client document browser is a web page browser.

* * * * *